Figures 1, 2:
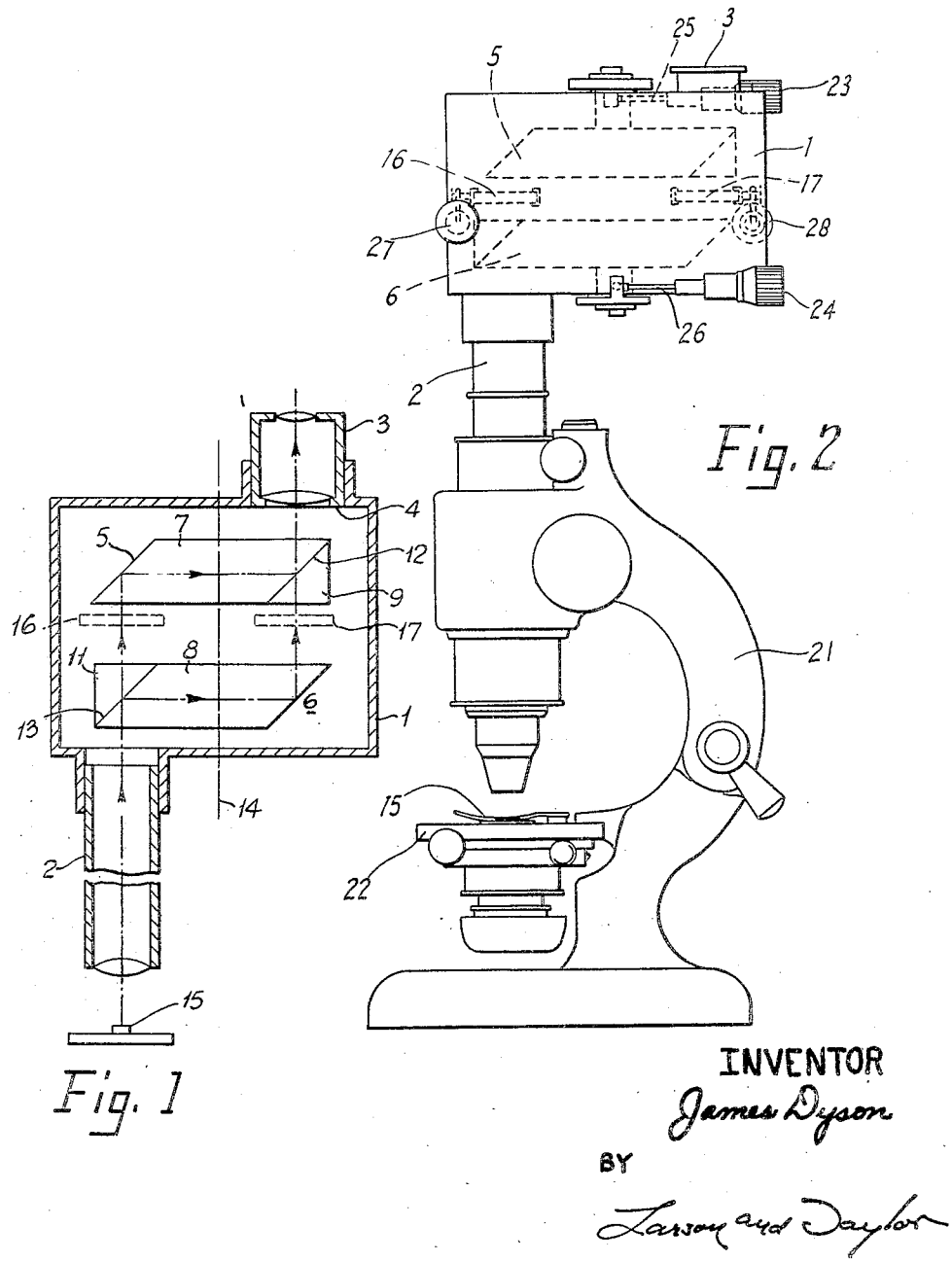

Dec. 18, 1962   J. DYSON   3,068,743
OPTICAL APPARATUS FOR MEASURING SMALL DISTANCES
Filed April 5, 1960

INVENTOR
James Dyson
BY
Larson and Taylor

United States Patent Office 3,068,743
Patented Dec. 18, 1962

1

3,068,743
OPTICAL APPARATUS FOR MEASURING
SMALL DISTANCES
James Dyson, Tilehurst, Reading, England, assignor to Associated Electrical Industries Limited, London, England, a British company
Filed Apr. 5, 1960, Ser. No. 20,131
Claims priority, application Great Britain Apr. 8, 1959
3 Claims. (Cl. 88—14)

The present invention relates to optical apparatus and in particular to optical apparatus for measuring small distances such as the width of a small object when viewed through a microscope.

Such operation is necessary when, for instance, the diameter of a fine wire or the diameter of a blood cell is to be measured accurately.

It is known that one of the best ways of accurately measuring a small distance, such as the diameter or width of an object when viewed through a microscope, is to form two images of the object and then to move the first image relative to the second image until the opposite edges of the two images are aligned. The amount that each image has to be moved can be accurately measured and this value is an accurate measurement of the diameter of the object. The alignment of opposite edges can be made with great precision, and hence apparatus incorporating such a principle can give very accurate results.

The object of the present invention is to provide improved optical apparatus for accurately measuring small distances.

According to the present invention, optical apparatus for measuring small distances between two points on an object comprises two optical systems, means for passing a beam of light from said object through each of said optical systems so as to form two normally coincident images of said object, means for moving said optical systems relative to one another in order to move said images apart so that one image of the first point coincides with one image of the second point, and means for measuring the relative movement of said optical systems necessary to cause said images of said two points to coincide as required.

Preferably, each of said optical system comprises a rhomboidal prism on one end of which is cemented a right angled prism with a partially reflecting interface between the prisms, and a beam of light is passed through each of said rhomboidal prisms and the associated right angled prism so as to form two images of the object.

Relative rotation of the pairs of prisms causes the images to move relative to one another.

The images are moved until opposite edges thereof move into alignment. The relative movement of the optical systems can be measured and this gives an accurate value of the relative distances moved by the images, and hence their width.

According to one embodiment of the invention, a plane-parallel glass block is included in each optical system and each block is capable of rotation relative to the corresponding optical system in order to cause movement of the corresponding image.

In order that the invention may be more readily understood reference will now be made to the accompanying drawings in which FIG. 1 is a diagrammatic side view, sectioned on a plane through the centre, of optical apparatus embodying the invention, and FIG. 2 is a side view of the whole apparatus.

With reference to the figure, the optical apparatus consists of a cointainer 1, which is adapted to fit over the top of a suitable microscope draw tube 2 and includes an eye-piece 3, located in a suitably placed aperture 4. Two

2 prism groups 5, 6 are located within the container 1 and comprise two rhomboidal prisms 7, 8 on one end of each of which are cemented two right angled prisms 9, 11. The interfaces 12, 13 between each pair of prisms are treated so as to be partially reflecting, for example, by partially metallising the surfaces of the prisms. The prism groups are located so that their principal axes are normally parallel and are capable of rotation relative to one another about a vertical axis 14, by any suitable mechanism.

The path of a light beam from an object 15 viewed through a microscope is shown by the arrowed lines. The beam is partially reflected at the interface 13 and is divided into two half beams. One of these half beams passes through the rhomboidal prism 8 and is reflected at the end of this prism and passes into the right angled prism 9, through the interface 12 and into the eye piece 3. The second half beam passes through the interface 13 and the right angled prism 11, into the rhomboidal prism 7, is internally reflected therein and is reflected off the interface 12 into the eye piece 3. Two images of the object 15 are therefore seen in the eye piece 3. If the prism groups 5, 6 are located parallel to one another, then these two images will co-incide but if the prism groups are rotated relative to one another about the axis 14, the images will move apart. The images will move in a direction which, for small relative rotations of the prism groups, is normal to the plane of the figure.

For rotation of one prism group, while the other is kept fixed, one image will remain fixed in position while the other describes a circular path of radius equal to the distance separating the axis of the eye piece and the axis of the draw tube. If both the prism groups are rotated in opposite directions, the images will move apart symmetrically and a line joining corresponding portions of the images will remain pointing in a fixed direction in space. There will be a general movement of the images towards the axis 14, but this will only be very small for movements apart of the images of less than half the field diameter and will cause no practical inconvenience.

If the images are moved relative to one another, so that opposite edges thereof move into alignment, and the relative movements of the prism groups are measured, these measurements will give an accurate measurement of the width of the object. The movement of the prism groups can be controlled by one or two micrometer screws and if these are suitably calibrated a direct measurement of the width of the object can be obtained. Two micrometer screws are conveniently used and they are conveniently geared together, each acting on a lever arm or suitable linkage fixed to one of the prism groups, in a well known manner.

For very accurate measurements for variations in the diameter of relatively large objects, it may not be possible to read the scales which indicate the relative rotation of the two prism groups sufficiently accurately. The apparatus is therefore modified for this use and two optically plane-parallel glass plates 16, 17 are placed between the two prism groups as indicated, so that each of the half beams passes through one of the plates. The plates 16, 17 are capable of being rotated about a horizontal axis in the plane of the FIGURE. Rotation of one of the plates will cause further relative movement of the two images when viewed in the eye piece 3. The amount of relative movement of the images will depend upon the thickness of each plate and the angle of rotation of the plate.

The method of operation of the modified form of the apparatus is as follows: The object is placed in position and the two images are moved apart by rotating the prism groups 5, 6 relative to one another until the opposite edges are nearly aligned. The prism groups are then clamped in position and the final alignment of the opposite edges is performed by rotation of one of the plates 16, 17. The reading of the scale indicating the relative rotation of the plates 16, 17 is noted. By choosing a suitable thickness for the plates 16, 17 a given rotation can be made to correspond to as small a movement of the image as desired, and hence the scale may then be made as open as the precision of the measurements requires. To compare the diameter of two objects, the second object is located in the place of the first object and the difference in diameter between the two objects may be measured directly on the open scale corresponding to small rotations of either of the plates 16, 17.

There is provided by the apparatus described above, means for accurately measuring the width of objects which are viewed through a microscope, and also for comparing the widths of larger objects which differ by only very small amounts. The apparatus can be readily fitted to an existing microscope without modifications of the latter.

An accuracy of the order of $2 \times 10^{-6}''$ can be obtained with the apparatus when a diameter of the order of $10^{-3}''$ is being measured.

FIGURE 2 illustrates a complete optical apparatus when used in combination with a microscope 21. The container 1 is fitted over the end of the draw tube 2 of the microscope, and the object 15 being examined is mounted on the support 22 of the microscope.

The positions of the two prism groups 5 and 6 are controlled respectively by two micrometer screws 23, 24, which include scales for measuring directly the rotation of each prism group. These scales could be calibrated to give directly the distance between the points which is required. The micrometer screws 23, 24, operate on levers 25, 26, which rotate shafts on which the prism groups are mounted.

The positions of the two glass blocks 16 and 17 are controlled respectively by two more micrometer screws 27, 28. These operate similarly on levers to rotate shafts on which are mounted the glass blocks, and the screws include scales suitably calibrated for measuring the rotation of the blocks or the displacement of the image.

What I claim is:

1. Optical apparatus for measuring small distances between two points on an object comprising two rhomboidal prisms located with their principal axes in parallel planes and rotatable relative to each other about a common axis perpendicular to said planes, two right angled prisms cemented respectively onto an end of said rhomboidal prisms, a partially reflecting interface between each rhomboidal prism and its respective right angled prism, said rhomboidal and right angled prisms cooperating such that a beam of light from said object is divided into two component beams on being incident onto one of said interfaces, said two component beams pass respectively through the two rhomboidal prisms along paths of equal optical length, and said two component beams join together again on being incident on the other of said interfaces so as to form two normally coincident images of said object, together with means for rotating each said rhomboidal prism about said axis so as to cause relative movement of two images and means for measuring the rotation of said rhomboidal prisms required to cause images of said two points to coincide.

2. Optical apparatus for measuring small distances between two points on an object comprising two rhomboidal prisms located with their principal axes in parallel planes and rotatable relative to each other about a common axis perpendicular to said planes, two right angled prisms cemented respectively onto opposite relative ends of said rhomboidal prisms with a partially reflecting interface between each rhomboidal prism and its respective right angled prism, all of said prisms cooperating such that a beam of light from said object is divided into two component beams on being incident onto one of said interfaces, said two component beams pass respectively through the two rhomboidal prisms along paths of equal optical length, and said two component beams join together again on being incident on the other of said interfaces so as to form two normally coincident images of said object, and two plane parallel sided glass blocks located respectively in the paths of said two component beams, together with means for rotating each said prism about said common axis relative to each other and means for rotating each block about another axis extending perpendicularly to the path of the associated component beam, so as to cause relative movement of said two images, and means for measuring the rotation of the prisms and the glass blocks required to cause images of said two points to coincide.

3. The invention of claim 2 wherein are provided means for rotation of the two rhomboidal prisms by equal and opposite amounts relative to a position of said prisms in which the two images coincide.

References Cited in the file of this patent

UNITED STATES PATENTS

| 587,443 | Konig | Aug. 3, 1897 |
| 2,699,092 | Rantsch | Jan. 11, 1955 |
| 2,730,008 | McGinn | Jan. 10, 1956 |

FOREIGN PATENTS

| 324,124 | Great Britain | Jan. 23, 1930 |